Dec. 3, 1957  E. REED ET AL  2,815,437
RESISTANCE WELDING MACHINE
Filed Oct. 12, 1955  4 Sheets-Sheet 3
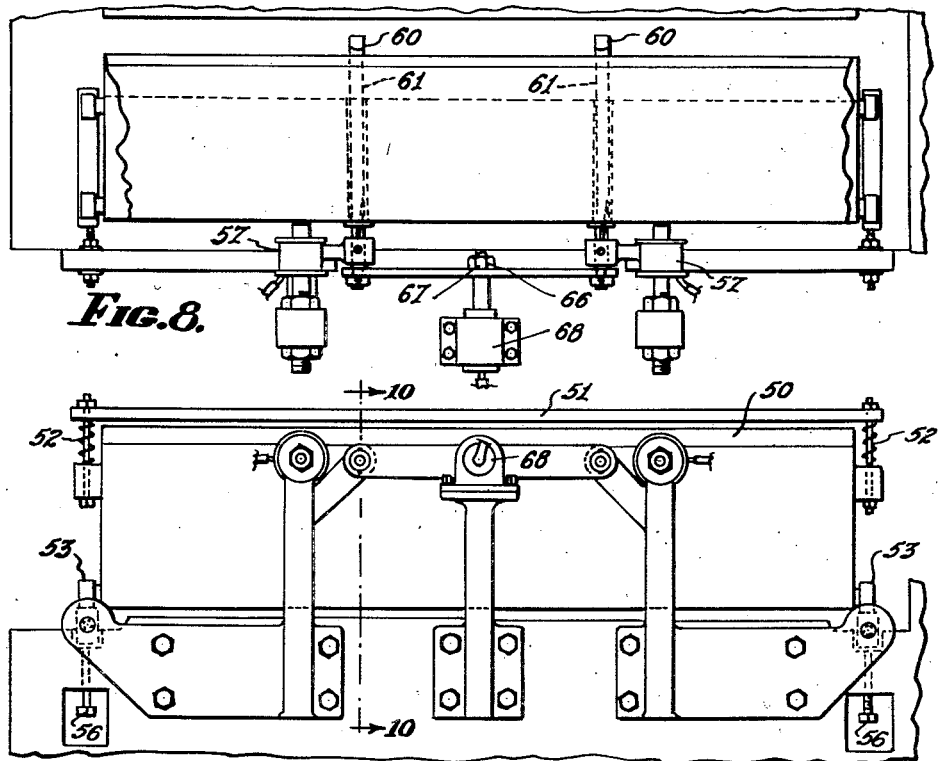
FIG.8.
FIG.9.
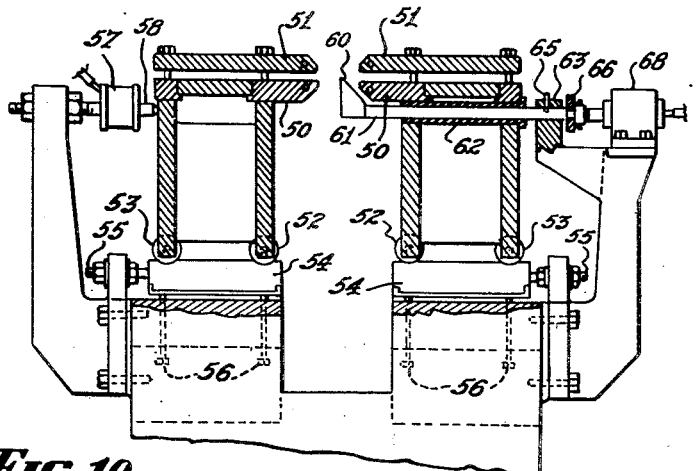
FIG.10.
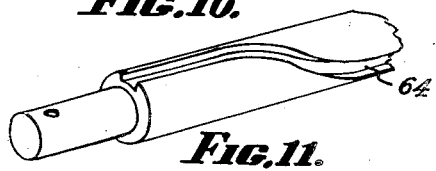
FIG.11.
INVENTORS.
EO REED
AND JAMES C. YOUNG,
BY
Allen & Allen
ATTORNEYS.

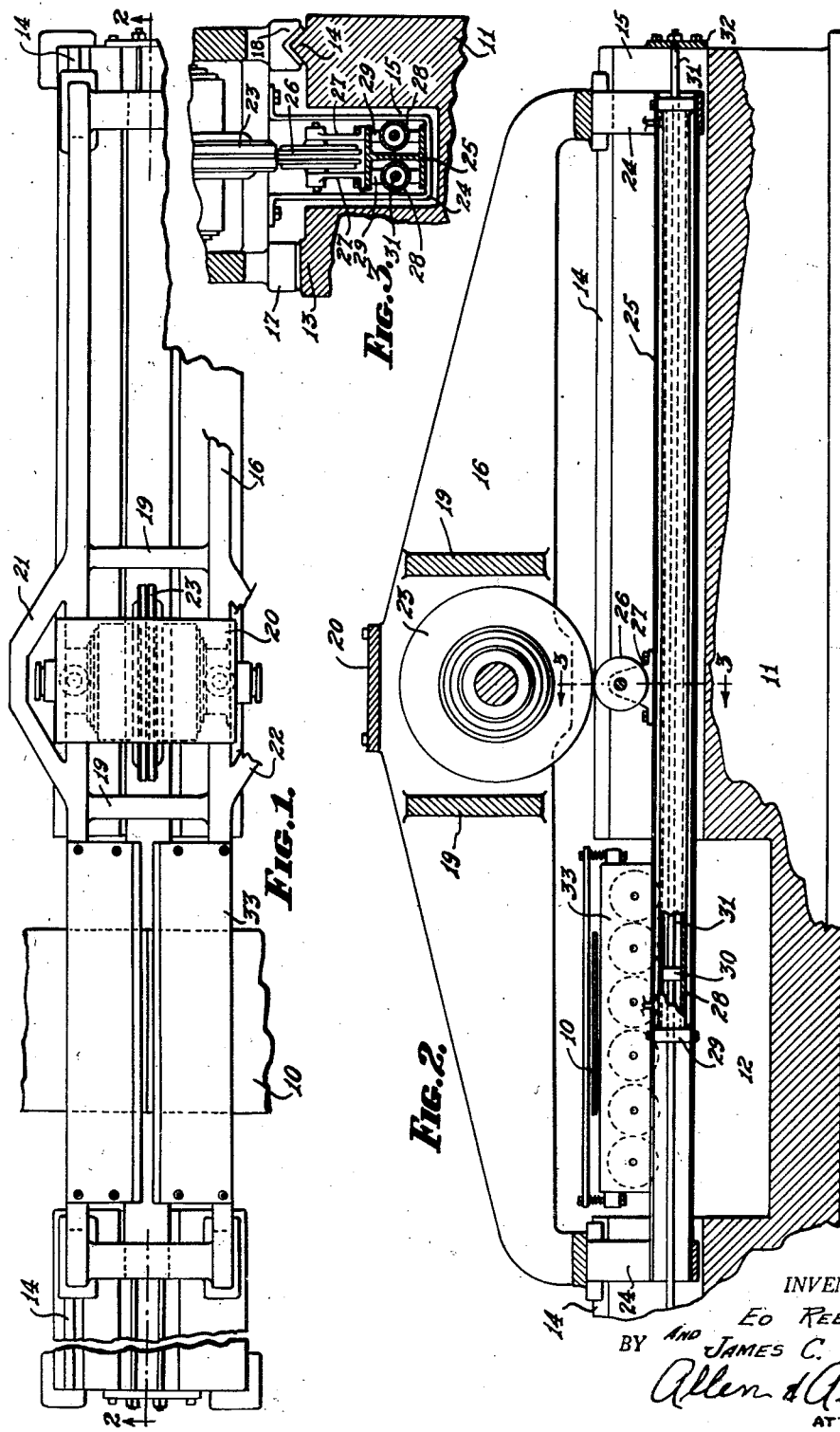

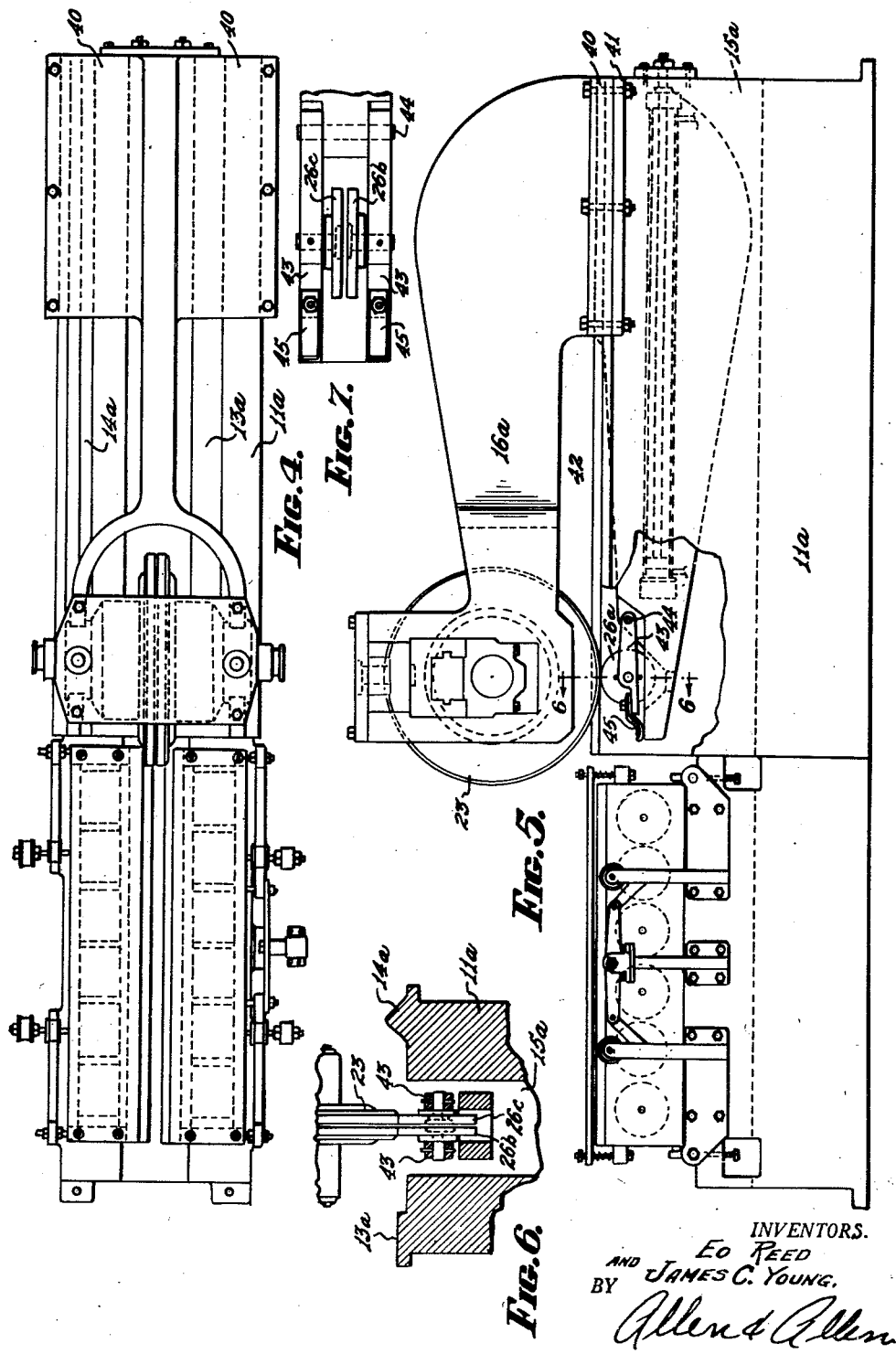

INVENTORS.
Eo Reed
AND James C. Young,
BY Allen & Allen
ATTORNEYS.

United States Patent Office 2,815,437
Patented Dec. 3, 1957

2,815,437

RESISTANCE WELDING MACHINE

Eo Reed and James C. Young, Middletown, Ohio, assignors to Armco Steel Corporation, Middletown, Ohio, a corporation of Ohio Application October 12, 1955, Serial No. 540,022

14 Claims. (Cl. 219—102)

This invention relates to a resistance welding machine and more particularly to a machine for welding together a plurality of sheets end to end to form a strip. Reference is made to the copending application of Eo Reed entitled "Resistance Welding Machine for Sheets," Serial No. 193,941, filed November 3, 1950, now Patent No. 2,730,601 dated January 10, 1956. In that patent there is disclosed a machine for welding sheets together end to end to form a strip. The present invention constitutes an improvement upon the machine of the said patent, particularly in connection with the mounting of the resistance welding wheel and the back-up wheel and the sheet clamping devices.

It is an important object of the present invention to provide an improved arrangement for guiding the welding wheel and back-up roller which will provide for perfect seam alignment and will minimize both horizontal and vertical error. It is another object of the invention closely related to the foregoing object to provide a machine which embodies great rigidity in frame elements which carry the welding wheel and back-up wheel.

It is another object of the invention to provide for a better clamping arrangement for the adjacent sheet edges to be welded and to provide means to adjust the amount of pressure necessary to obtain the correct upset on the weld.

Yet another object of the invention is to provide an arrangement permitting a pivoting movement of the clamps whereby to eliminate cooling breaks which normally tend to result from increased tension when the area of the weld cools down.

Another important object of the invention is to provide a novel mounting for the back-up roll whereby the pressure between the back-up roll and the welding roll will be the same on both of the pieces to be welded together regardless of gauge variation.

These and other objects of the invention which will be pointed out in greater detail hereinafter or which will be apparent to one skilled in the art upon reading these specifications, we accomplish by that certain construction and arrangement of parts of which we shall now disclose certain exemplary embodiments.

Reference is made to the drawings forming a part hereof and in which:

Figure 1 is a fragmentary plan view of one embodiment of the invention.

Figure 2 is a fragmentary cross-sectional view of the same taken on the line 2—2 of Figure 1.

Figure 3 is a fragmentary cross-sectional view on an enlarged scale taken on the line 3—3 of Figure 2.

Figure 4 is a plan view of a second embodiment of the invention.

Figure 5 is an elevational view of the same with parts broken away.

Figure 6 is a fragmentary cross-sectional view on an enlarged scale taken on the line 6—6 of Figure 5.

Figure 7 is a fragmentary plan view of the back-up roller and its mounting on an enlarged scale.

Figure 8 is a fragmentary view in plan of one of the clamps.

Figure 9 is an elevational view of the same.

Figure 10 is a cross-sectional view of the same taken on the line 10—10 of Figure 9.

Figure 11 is a fragmentary perspective view on an enlarged scale of one of the sheet stock members.

Figures 14 to 18 inclusive are semi-diagrammatic cross-sectional views illustrating the sequence of operations in the positioning of the sheets to be welded and the welding operation itself.

Briefly, in the practice of our invention we provide, in a machine for welding metal sheets end to end to form a strip, a pair of rails disposed transversely to the direction of strip travel and approximately in the plane of strip travel, one of the rails being disposed to each side of the seam to be welded. Arranged to ride on the rails above mentioned we provide a massive carriage which has ways engaging said rails and carrying the resistance welding wheel in a position so that when the massive carriage is moved transversely to the strip, the welding wheel will ride over the seam to be welded. The massive carriage has a portion extending below the plane of strip travel and the lower portion carries a back-up wheel which is positioned vertically directly beneath the welding wheel. Means are provided for clamping the butted edges of the sheets for a welding operation. A supply of welding current to the welding wheel is provided and means are associated with the carriage to move the carriage along the rails in a welding pass.

Within the broad framework outlined above, we have shown two very different specific embodiments of the general concept. In one embodiment, the rails extend on both sides of the path of strip travel and the massive carriage is in the form of a bridge of an extent more than twice the strip width so that the carriage may cause the welding wheel and its back-up roller to traverse the strip from right to left in one pass and from left to right in a succeeding pass.

In another embodiment, the massive carriage is in the form of a heavy C-clamp having a throat of sufficient depth to accommodate the strip and the rails upon which the C-clamp rides are disposed to one side only of the path of strip travel. In this embodiment again the C-clamp may move from right to left causing the welding wheel and its back-up roller to perform a weld and may then move from left to right in performing a succeeding weld. The first of these embodiments is illustrated in Figures 1 to 3 and the second in Figures 4 to 7 inclusive.

For purposes of simplification, we have shown an improvement in the back-up roller in connection with the embodiment of Figures 4 to 7 inclusive, but it should be understood that the back-up roller and its mounting specifically illustrated in Figures 4 to 7 may equally well be used in the embodiment of Figures 1 to 3 inclusive and similarly that the back-up roller structure of Figures 1 to 3 inclusive may be used in the embodiment of Figures 4 to 7 inclusive.

Figures 12, 13:
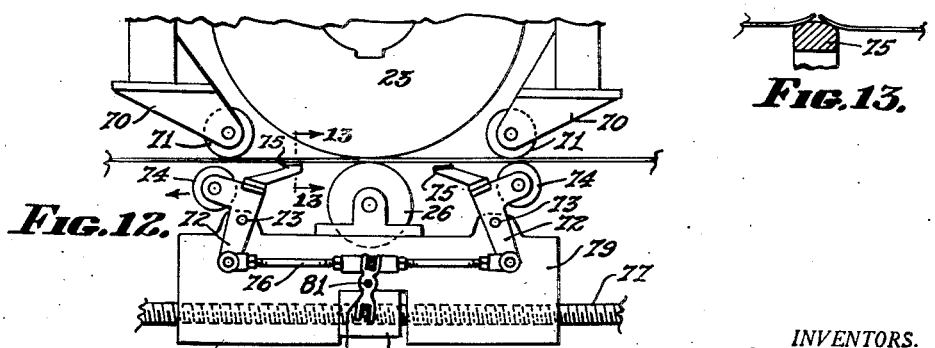
Figure 12 is an elevational view of a welding wheel and back-up roller which may be either of the type of Figures 1 to 3 or of Figures 4 to 7, showing means for rolling down the seam and means for slightly elevating the butted edges to be welded.
Figure 13 is a fragmentary cross-sectional view on an enlarged scale taken on the line 13—13 of Figure 12.

It should also be noted that the arrangement for rolling down the weld illustrated specifically in Figures 12 and 13 and the arrangement for elevating the edges to be welded may be used with the embodiment of either Figures 1 to 3 or Figures 4 to 7 inclusive. Similarly, the clamping arrangement of Figures 8 to 11 inclusive may be used with either embodiment and the sequence of operations illustrated in Figures 14 to 18 will be the same with either embodiment.

Coming now to a specific description of the invention and with reference to Figures 1 to 3 inclusive, we have shown an embodiment wherein the cross-section of the strip being welded may be seen at 10 in Figure 2. The machine rests upon a heavy frame indicated generally at 11, which in this particular embodiment is cut away at 12 for the passage of the strip and in order to accommodate the clamping mechanisms. Formed as a portion of the frame 11 are the rails or guide surfaces 13 and 14. Preferably the surface 14 will be formed as an inverted V and the surface 13 will be a flat surface. It will be observed that the rails 13 and 14 are also interrupted in the region 12 and that they are continued therebeyond. Furthermore, the frame 11 is channeled at 15 in a direction parallel to the rails 13 and 14 to accommodate the lower portion of the moving part of the mechanism.

Mounted for movement back and forth upon the rails 13 and 14 is a massive bridge element 16. This element is provided with ways cooperating with the rails 13 and 14 as at 17 and 18. We prefer that the bridge element 16 be more than twice the width of any strip to be welded so that the welding wheel to be described hereinafter, when centrally mounted on the bridge element, can traverse the strip moving in one direction on one pass and in a reverse direction on a succeeding pass. The dimensions should, therefore, be such that the span between each end of the bridge element and the welding wheel is sufficient to span across the opening 12. It will of course be understood that in some cases it may be desirable to return the bridge element in an idling pass and to make all welding passes with the welding wheel moving in the same direction. In such cases of course the dimensions of the bridge element 16 could be reduced.

The bridge element 16 is provided with the bracing webs 19, 20, 21 and 22. Rotatably mounted upon the bridge element 16 is the welding wheel 23. The details of this wheel do not form a part of the present invention and will therefore not be described in detail except to state that in accordance with well known practices the wheel comprises two discs separated by insulating material, so that when current passes through one disc into the work, it returns through the other disc. Means are provided also for adjusting the position of the bearings of the welding wheel 23.

Secured to the ends of the bridge element 16 are the stirrups 24 which extend downwardly into the recessed portion 15 and between which a heavy beam 25 extends. The beam 25 may be an I-beam as best seen in Figure 3. The beam 25 is thus rigidly secured to the bridge element 16 and is adapted to move therewith. Mounted upon the I-beam 25 vertically directly below the welding wheel 23 is a back-up wheel 26. In this particular embodiment the back-up wheel is shown as being mounted upon bearing brackets 27 which are secured to the beam 25. This mounting, which may be utilized with this embodiment, will be described in connection with Figures 4 to 7.

For the purpose of moving the bridge element 16 and the beam 25 together with the welding wheel 23 and back-up wheel 26, we provide a pair of elongated cylinders 28 which may be secured as at 29 to the I-beam 25 and we provide a piston 30 within the cylinder 28 secured to an elongated piston rod 31 which is secured to the frame 11 as indicated generally at 32. From a consideration of Figure 2, it will be clear that when a fluid is admitted in the left end of the cylinder beyond the piston 30, the piston being stationary, the cylinder will be pulled toward the left of Figure 2 and will carry with it the entire moving portions of the machine; then when fluid is admitted on the right side of the piston 30, a reverse action will take place and the apparatus will return to the position of Figure 2.

The clamping mechanism for clamping the adjacent edges to be welded is indicated generally at 33 and will be described in greater detail in connection with Figures 8 to 11 inclusive.

It will be seen that by the construction of Figures 1 to 3 inclusive we have provided a pair of rails which are substantially in the plane of strip travel, one to each side of the seam to be welded, and that we have provided a massive structure not readily subject to deflection to support and move the welding wheel and back-up wheel.

Referring now to the embodiment of Figures 4 to 7 inclusive, the general structure of the basic frame 11a is similar to that of Figures 1 to 3, except that it extends only to one side of the path of strip travel. It is again channeled at 15a to accommodate the lower portion of the moving carriage. Again the rails 13a and 14a are provided and the moving portion of the apparatus in this instance comprises a massive C-shaped member 16a. This member is provided with the flanges 40 which are provided, respectively, with ways to cooperate with the tracks 13a and 14a and the frame 16a is retained on the tracks by means of the gibs 41. The throat 42 of the C-shaped member 16a is of sufficient depth that the welding wheel may traverse the strip and clear it so that on a third pass a succeeding weld may be performed. The welding wheel 23 is the same as in the previous embodiment and it is rotatably and adjustably mounted in the upper arm of the member 16a. The back-up wheel 26a which will be described in more detail hereinafter is mounted on the lower arm of the member 16a. The piston and cylinder structure described above in connection with Figures 1 to 3 may be used with this embodiment as shown in broken lines in Figure 5.

It sometimes happens that succeeding sheets to be welded together will not be of exactly the same thickness or gauge. In such cases the pressure between the welding wheel and back-up wheel on the two edges to be welded is not the same. This is an undesirable situation and we have shown in connection with this embodiment an arrangement for overcoming this difficulty. It will be understood that the back-up wheel shown in these figures may be used with the structure of Figures 1 to 3.

According to this embodiment, the back-up wheel comprises two separate wheels 26b and 26c, as best seen in Figures 6 and 7. Each of these wheels is mounted upon a lever arm 43 which is pivoted to the lower arm of the member 16a as at 44. To the free end of each lever 43 is secured a leaf spring 45 which bears upon the lower arm of the frame 16a and tends to urge the respective wheel 26b or 26c against the welding wheel 23. It will thus be seen that each wheel 26b and 26c exerts pressure independently in backing up the welding wheel 23 and that the two edges to be welded together will be subject to equal pressure even if one is thicker than the other.

From what has been said before, it will be understood that the embodiment of Figures 4 to 7 inclusive, while it differs specifically in details from the embodiment of Figures 1 to 3, nevertheless conforms to the basic concept of a pair of rails substantially in the plane of strip travel, one to each side of the seam to be welded and a massive unitary structure carrying both the welding wheel and the back-up wheel arranged to ride on these rails to cause the welding wheel and back-up wheel to perform a transverse weld. By the construction of both of these embodiments, the deflection both vertically and horizontally is reduced substantially to zero and the very minimum error is encountered at the contact surface of the welding wheel or back-up roller. It will also be observed that the carriage in its movement is entirely independent of the clamps so that the clamps may function as desired and are not affected by and do not affect the travel of the welding wheel and the back-up wheel.

We have found it desirable in this type of operation to employ magnetic clamps. Magnetic clamps have a greater holding power than mechanical clamps of the same size. Furthermore, when the trailing end of the welded strip has been lined up and clamped, as will be described hereinafter, the strip end projecting from the clamp is magnetized and has a magnetic pull on the oncoming sheet which is being pushed into position by hand. This assists in butting the ends of the sheet and strip tightly together. When the advance edge of the succeeding sheet has been clamped, because the polarity of the poles of the clamps then should be the same, the sheet ends will repel each other and thus permit free movement of the sheet ends in connection with the final positioning thereof for welding.

Referring now to Figures 8 to 11 inclusive, the lower clamp members are indicated at 50 and the upper members are indicated at 51. The upper members 51 are suitably guided and retained in connection with the lower members by the pin and spring arrangement generally indicated at 52 in Figure 9. The basic structure of the magnetic clamps is not new and is not claimed by us as our invention. However, the mounting of the clamps we believe to be novel and the mounting involves a provision for adjustment of the clamps vertically, horizontally and as to their level, and it involves a mounting such that the clamps may pivot, as will be pointed out hereinafter. In Figure 10 we have shown the lower portions of the clamps 50 as being provided with the wheels 52 and 53. These wheels rest in the arcuate notches in the supporting members 54. The supporting members or rails 54 are susceptible of adjustment in their horizontal direction by means of the adjusting screws 55. Their vertical position and their level may be adjusted by the screws 56. Adjustment of the screws 55 and 56 determines the at rest position of the respective clamps. In connection with each of the clamps, there are provided the cylinders 57 having plungers 58 bearing against the respective clamps, so that by the application of fluid pressure to the cylinders 57 the clamps may be urged toward each other in a somewhat tilting movement about the wheels 52. By means of the cylinders 57 the proper amount of pressure may be applied to the clamps to obtain the correct upset on the wheel. The amount of upset material required varies considerably with the grade and gauge of the steel sheets being welded. As an example, with 24 gauge low silicon steel, the upset may be approximately .010 inch total. Depending upon the gauge and quality of the material being welded, pressure adjustment may be made to obtain the correct amount of upset.

Another advantage of the clamping arrangement disclosed herein is that tension breaks are avoided. We have found that where clamps are rigidly mounted, tension breaks occur quite frequently if the clamps were not released quickly after the weld is completed. This is because of the contraction of metal adjacent to the weld which actually produced breaks with the rigid clamps. With the clamping structure herein disclosed, the clamps may pivot about the wheels 52 as the material contracts and tension breaks will not occur even if the clamps are not released quickly.

In Figures 8 to 11 inclusive we also show the mechanism for operating the aligning fingers. The aligning fingers are indicated at 60 and are mounted on the ends of the rods 61. The rods 61 have bearings as at 62 and pass through holes in the brackets 63. Each of the bars or rods 61 has a cam track 64 with which the pin 65 engages, the pin 65 being fixed in the brackets 63. The ends of the rods 61 are connected together by a bar 66 which is secured at 67 to the piston of an air cylinder 68.

It will now be clear that when the piston is withdrawn into the cylinder, the bar 66 will be retracted to the right in Figure 10, or downwardly in Figure 8, thus pulling on the rods 61. As a result of the engagement of the pins 65 with the cam tracks 64, the aligning fingers 60 will be rotated 90° as they are being withdrawn to the position best seen in Figure 14.

Figure 14:
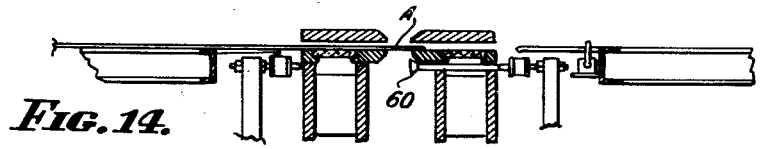
Figure 15:
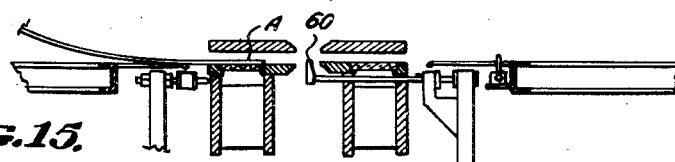
Figure 16:
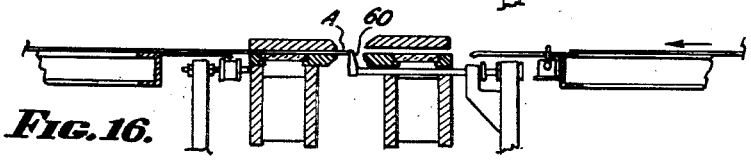
Figure 17:
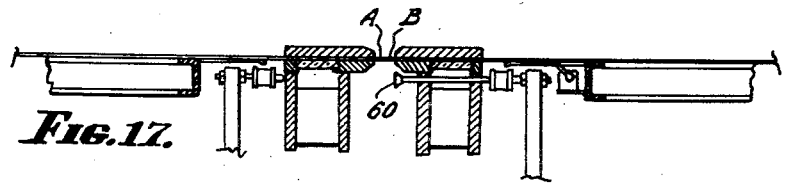
Figure 18:
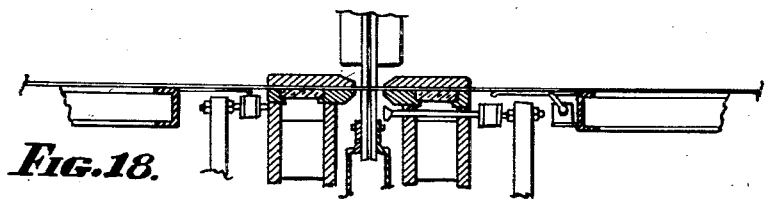

The sequence of operations in aligning the edges to be welded is best seen in Figures 14 to 18 inclusive, and is like that described in the Reed patent above referred to. In these figures the strip is to be considered as moving from right to left. In Figure 14, the trailing end of the previously welded strip is indicated at A. After this trailing end has passed the seam line, as shown in Figure 15, the aligning fingers 60 are thrust into position as described above. The trailing end A of the previously welded strip is permitted to back up against the aligning pins 60 and the left hand clamp is energized as shown in Figure 16. The leading edge B of a sheet to be welded to the trailing edge A of the previously welded strip is then butted thereagainst and the right hand clamp is energized as seen in Figure 17. The aligning fingers 60 in the meantime have been withdrawn. Figure 18 shows the relationship of the edges during the welding operation.

In the welding of thin sheets together, it has been found advisable to deflect the butted edge slightly out of the plane of the strip and in the said Reed patent this was accomplished as a part of the aligning procedure. According to the present invention, this is accomplished rather as a part of the welding procedure in that the sheets are clamped with the edges to be welded in the plane of the strip but as the welding operation proceeds, a shoe in advance of the welding wheel raises the edges and causes them to separate slightly in order to position them ideally for the welding operation.

With reference now to Figures 12 and 13 wherein the welding wheel 23 and back-up wheel 26 may be considered to be moving from right to left during a seam welding operation, we provide on each side of the welding wheel and secured to rigid brackets 70 the rolling wheels 71. Below the strip we provide, to each side of the back-up wheel, the bell crank levers 72 pivoted at 73. The bell crank levers 73 carry the back-up rolling wheels 74 and the bronze spreader shoes 75 (see in cross-section in Figure 13). The lower ends of the bell crank levers 72 are secured together by a link 76. It will be clear that with the link 76 in the position shown both bell crank levers have been rocked in a counterclockwise direction, so that the back-up wheel 74, to the right of or trailing the welding operation, will be brought to bear against its corresponding rolling wheel 71, while the shoe 75 will be clear of the weld. The counterclockwise rocking of the left hand bell crank lever in Figure 12 has cleared the back-up roller 74 from the strip but has raised the bronze shoe 75 to its operative position to raise and spread the edges in advance of the welding wheel. This is the position occupied by the parts during a leftward pass in Figure 12. In a pass toward the right, the position of the parts will be reversed and the left hand back-up roller 74 will be brought to bear against its wheel roller 71 and its shoe 75 will clear the strip, while on the right hand side the bronze shoe 75 will come into operative position and the right hand back-up roller 74 will clear the strip.

In the particular embodiment shown in Figure 12, we have shown a simple mechanism for shifting the link 76 in connection with a screw feed. The screw 77 passes through a nut 78 which is confined with a slight amount of play in the member 79 which carries the backing up structure. A double forked member 80 is pivoted at 81 with one fork engaging a pin on the nut 78 and the other fork engaging a pin secured to the link 76. It will be clear that when the rotation of the screw 77 is reversed, the nut 78 will travel toward the right of Figure 12 a small amount, which will result in a shifting of the link 76 to its other position before the member 79 begins to travel toward the right. It will be understood that the bronze shoe 75 may operate from above the strip or from below and that the edges of the sheet of strip may be pressed below or above the pass line. The bronze shoe assures a perfect geometry for the edges to be welded and the trailing rollers serve to roll the seam down perfectly flat. This is of particular importance where this apparatus is used to weld silicon steel sheets into a strip for the reason that it is desirable to stamp motor laminations and the like even across a welded seam without adversely affecting the space factor in the stack of laminations.

It will be understood that numerous variations may be made without departing from the spirit of the invention and that we therefore do not intend to limit ourselves than as set forth in the claims which follow.

Having now fully described our invention, what we claim as new and desire to secure by Letters Patent is:

1. In a machine for welding metal sheets end to end to form a strip, a pair of rails disposed in a direction transverse to the direction of strip travel and approximately in the plane of strip travel, one of each side of the seam to be welded, a massive carriage having ways engaging said rails, said carriage carrying a resistance welding wheel in a position to ride over the seam to be welded upon reciprocation of said carriage, said carriage having a portion extending below the plane of strip travel and carrying a back-up wheel positioned vertically directly beneath said welding wheel, means for clamping the butted edges of said sheets for welding, means for supplying welding current to said welding wheel, and means for moving said carriage in a welding pass.

2. A machine according to claim 1, wherein said back-up wheel comprises two separately mounted wheels each adapted to back up one of the edges to be welded together, and separate means urging each of said wheels upwardly, whereby substantially equal pressure will be exerted by said welding wheel on both edges to be welded in spite of possible gauge variations.

3. A machine according to claim 2, wherein each of said separately mounted wheels is rotatable on a lever arm, and each said lever arm is pivoted to said carriage, and a leaf spring is secured to the free end of each lever arm and bears against said carriage to urge said wheels against said welding wheel.

4. In a machine for welding metal sheets end to end to form a strip, a pair of rails disposed in a direction transverse to the direction of strip travel and approximately in the plane of strip travel, one to each side of the seam to be welded, said pair of rails extending in both directions from the strip and being interrupted for the passage of the strip, a massive bridge element having pairs of ways engaging said rails on each side of the strip, a welding wheel rotatably mounted on said bridge element to ride over the seam to be welded upon reciprocation of said carriage, a massive beam element rigidly secured to said bridge element and extending from end to end thereof below the plane of strip travel, a back-up wheel rotatably mounted on said beam element vertically directly beneath said welding wheel, means for clamping the butted edges of said sheets for welding, means for supplying welding current to said welding wheel, and means for moving said bridge element in a welding pass.

5. A machine according to claim 4, wherein said back-up wheel comprises two separately mounted wheels each adapted to back up one of the edges to be welded together, and separate means urging each of said wheels upwardly, whereby substantially equal pressure will be exerted by said welding wheel on both edges to be welded in spite of possible gauge variations.

6. A machine according to claim 5, wherein each of said separately mounted wheels is rotatable on a lever arm, and each said lever arm is pivoted to said beam element, and a leaf spring is secured to the free end of each lever arm and bears against said beam element to urge said wheels against said welding wheel.

7. In a machine for welding metal sheets end to end to form a strip, a pair of rails disposed in a direction transverse to the direction of strip travel, to one side of the path of strip travel, and approximately in the plane of strip travel, one to each side of the seam to be welded, a massive C-shaped frame element having ways engaging said rails, one arm of said C-shaped element being above, and one below, the plane of strip travel, a welding wheel rotatably mounted on the free arm of said C-shaped element to ride over the seam to be welded upon reciprocation of said C-shaped element along said rails, a back-up wheel rotatably mounted on the lower arm of said C-shaped element vertically directly beneath said welding wheel, means for clamping the butted edges of said sheets for welding, means for supplying a welding current to said welding wheel, and means for moving said C-shaped element in a welding pass.

8. A machine according to claim 7, wherein said back-up wheel comprises two separately mounted wheels each adapted to back up one of the edges to be welded together, and separate means urging each of said wheels upwardly, whereby substantially equal pressure will be exerted by said welding wheel on both edges to be welded in spite of possible gauge variations.

9. A machine according to claim 8, wherein each of said separately mounted wheels is rotatable on a lever arm, and each said lever arm is pivoted to said frame element, and a leaf spring is secured to the free end of each lever arm and bears against said frame element to urge said wheels against said welding wheel.

10. In a machine for welding metal sheets end to end to form a strip, a pair of mutually opposed clamping means extending transversely of the path of strip travel and adapted to clamp, respectively, the trailing end of the strip, and the leading end of the sheet to be welded thereto, said clamping means being mounted for pivotal movement about an axis parallel to the seam to be welded and removed from the plane of strip travel, means for adjusting the "at rest" position of said clamps vertically, horizontally, and as to their level, and means to exert a pressure on said clamps to urge them toward each other.

11. A machine according to claim 10, wherein said clamps are magnetic clamps.

12. In a machine for welding metal sheets end to end to form a strip, having a carriage movable transversely of a path of strip travel in a welding pass, said carriage having a welding wheel and a back-up wheel, means for progressively spreading apart and elevating the edges to be welded in advance of said welding wheel comprising an inverted V-shaped shoe mounted on said carriage, and means for moving said shoe into operative position for a welding pass.

13. In a machine for welding metal sheets end to end to form a strip, having a carriage movable transversely of a path of strip travel in a welding pass, said carriage having a welding wheel and a back-up wheel, means on each side of said welding wheel in the line of the seam to be welded for progressively spreading apart and elevating the edges to be welded in advance of said welding wheel, each said means comprising an inverted V-shaped shoe mounted on said carriage, and means for concurrently moving into operative position that shoe in the direction of which said welding wheel is moving, and retracting the other shoe.

14. In a machine for welding metal sheets end to end to form a strip, having a carriage movable transversely of a path of strip travel in a welding pass, said carriage having a welding wheel and a back-up wheel, a seam roller mounted on a fixed bearing on each side of said welding wheel to roll on the seam ahead of, and behind the welding wheel, a back-up roller for each of said seam rollers, each said back-up roller being mounted on a movable bearing, a sheet edge displacing shoe associated with each back-up roller, and means for concurrently shifting said shoes and back-up rollers to activate the shoe in advance of the welding and back-up wheels, and the back-up roller trailing the welding and back-up wheels, and to reverse the position of said back-up rollers and shoes upon reversal of movement of said carriage.

(References on following page)

References Cited in the file of this patent

UNITED STATES PATENTS

| | | |
|---|---|---|
| Re. 16,804 | Sessions | Nov. 29, 1927 |
| 1,215,964 | Murray | Feb. 13, 1917 |
| 1,904,112 | Achard | Apr. 12, 1933 |
| 2,013,517 | Kachel | Sept. 3, 1935 |
| 2,023,086 | Lavallee | Dec. 3, 1935 |
| 2,147,868 | Von Henke | Feb. 21, 1939 |
| 2,412,648 | Rendel | Dec. 17, 1946 |